Nov. 13, 1962

M. L. FREEMAN 3,063,469

THREE-WAY VALVE

Filed Sept. 14, 1959

Mathew L. Freeman
INVENTOR.

BY Carl B. Fox, Jr.

ATTORNEY

Mathew L. Freeman
INVENTOR.

BY Carl B. Fox, Jr.
ATTORNEY

Mathew L. Freeman
INVENTOR.

BY Carl B. Fox, Jr.
ATTORNEY

United States Patent Office 3,063,469
Patented Nov. 13, 1962

3,063,469
THREE-WAY VALVE
Mathew L. Freeman, Fort Washington, Pa., assignor to McEvoy Company, Houston, Tex., a corporation of Texas
Filed Sept. 14, 1959, Ser. No. 839,930
16 Claims. (Cl. 137—627.5)

This invention pertains to valves, and more particularly to three-way valves such as are frequently used for diverting flow in a conduit to one of two outlet conduits. The subject valves also provide for shutting off flow altogether.

A principal object of the invention is to provide three-way valves which are completely balanced.

Another object of the invention is to provide such balanced three-way valves in which one outlet is closed before the other outlet is opened.

Another object of the invention is to provide such valves which can be used as shut-off means for entirely terminating flow.

Another object of the invention is to provide such valves which are dependable and safe in operation, yet which are low in cost.

A further object of the invention is to provide such valves which have increased pressure operating ranges.

The valves commonly referred to as "three-way" valves are most often used, in connection with petroleum production, where flow from a well through a conduit must also, at frequent or infrequent intervals, be run through test equipment to ascertain that operating conditions are satisfactory, the test equipment commonly being out of line or in parallel with the main flow stream, so that to make a test all or some of the materials in the main flow stream must be diverted therefrom for passage through the test equipment. To avoid material separations it is preferable to divert the main flow stream in its entirety through the test equipment for a short test period and then to resume normal flow of the main flow stream. The main flow is usually to a main separator, and the test equipment is usually a small separator capable of determining what results the main separator should achieve, so that if those results are not being achieved in the main separator, corrections can be made. The test equipment is capable of accurate results with a small sample, so that the diverted test stream is maintained for only short periods. Many flow streams may lead to one main separator, and it is desirable to separately test each, the main separator being maintained in operation continuously, and each separate flow stream thereto being diverted for testing separately at intervals.

It is desirable that the three-way valves used for diverting the flow streams be of balanced design, and it is also desirable that the three-way valves be of "fail-safe" design so that overloading of the test equipment will not occur should a valve become stuck in the flow diverting position. Overloading of the test equipment is also prevented because the diverted flow does not commence until the main flow is shut off, there being a momentary "off" condition between main and diverted flow.

Other objects and advantages of the invention will appear from the following description of preferred embodiments thereof, reference being made to the accompanying drawings, of which:

Figure 1:
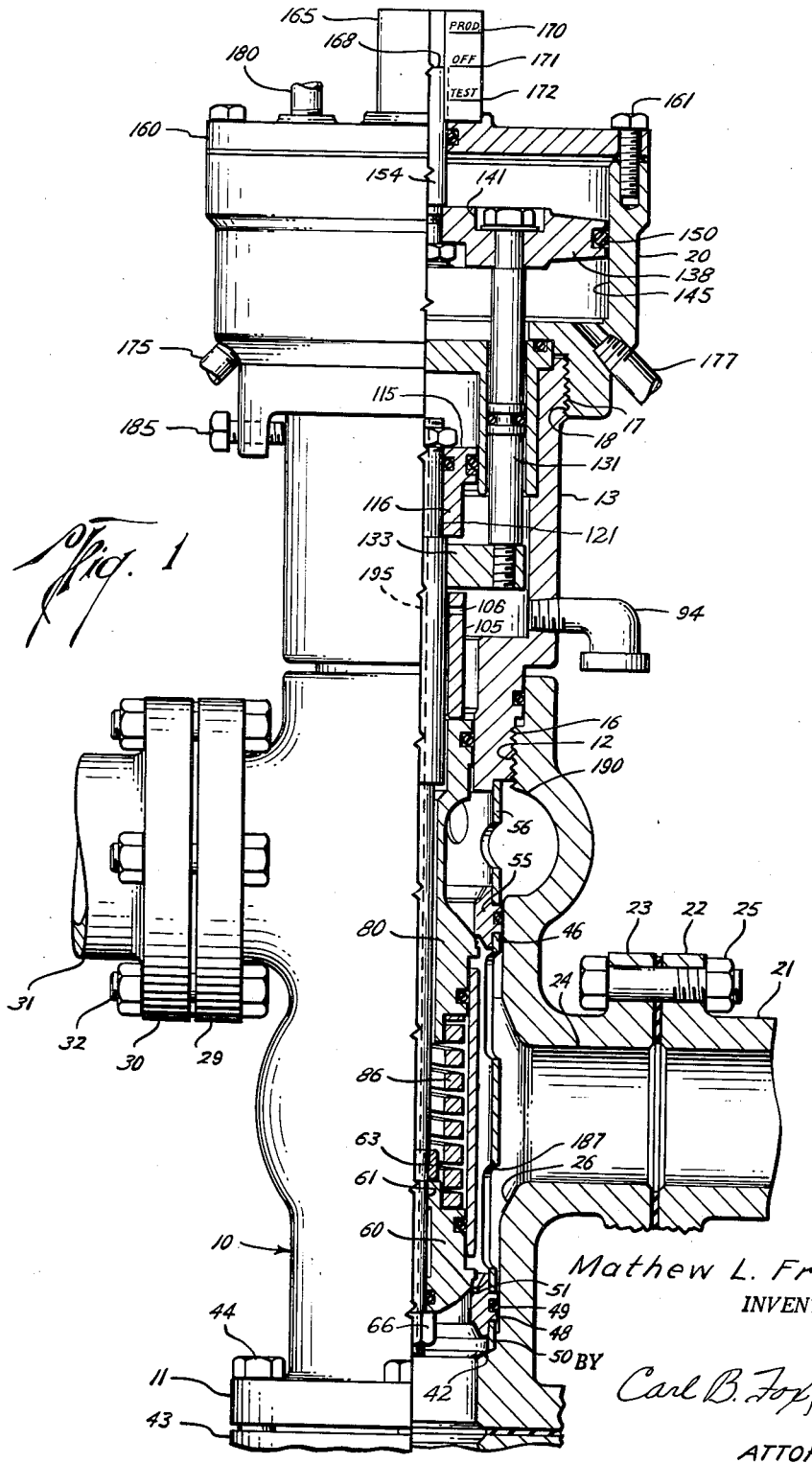
FIGURE 1 is a vertical quarter section of a preferred form of valve according to the invention, the valve being in the "off" condition.

Referring to the drawings, and first particularly to FIGURE 1 showing a first form of valve in the "off" or "shut off" condition as to both main and diverted flow, so that the valve functions as a flow line shut-in means, a vertically elongate valve body 10 has lower bolting connection flange 11 and upper threaded socket 12 for connection of an actuator or operator body 13. Body 13 has lower exterior threads 16 screwed into socket 12, and has upper external threads 17 screwed into threaded socket 18 of a chamber body 20.

Figure 2:
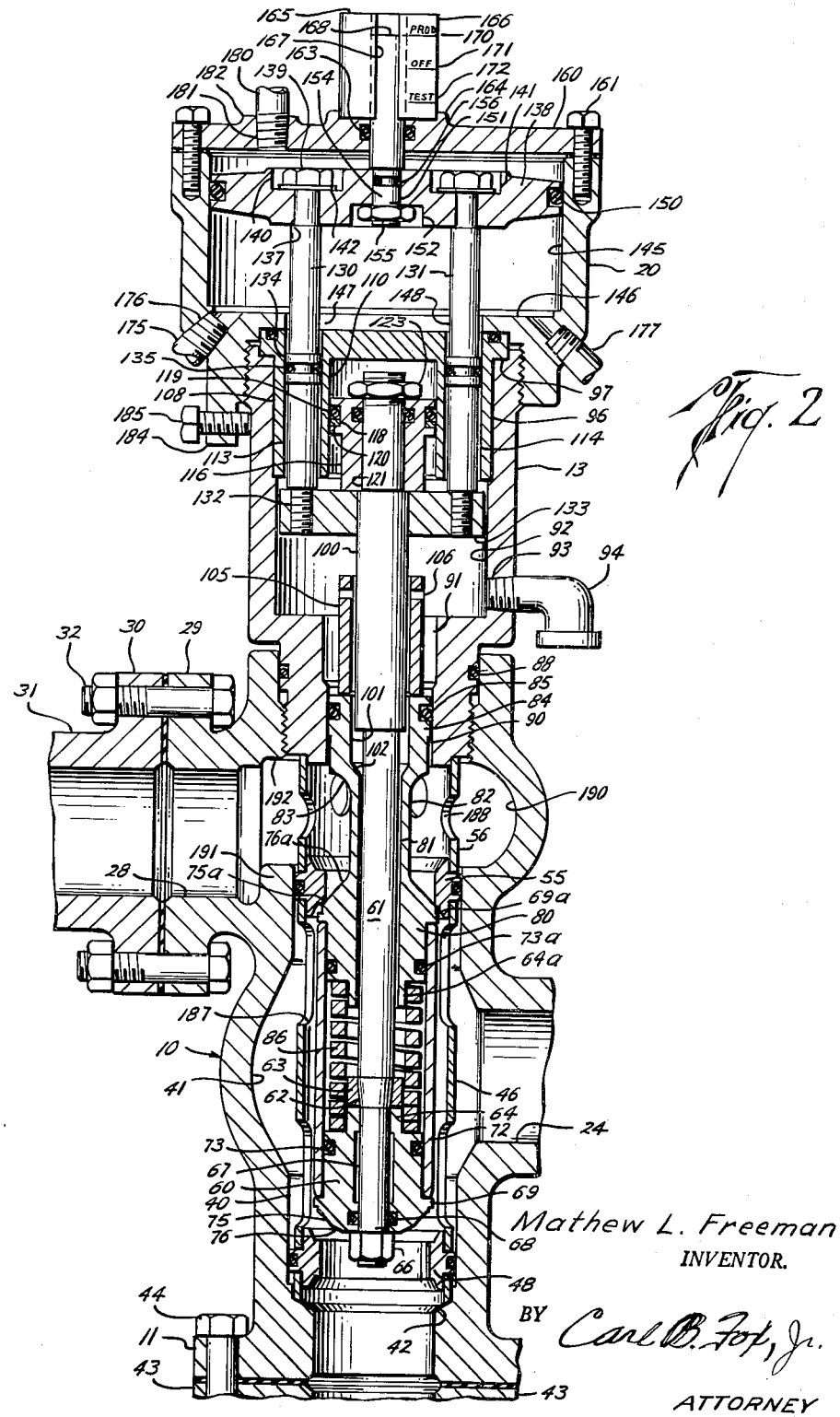
FIGURE 2 is a vertical section of the valve of FIGURE 1 in the condition wherein the main flow stream is "on" and the diverted stream is "off"
Figure 3:
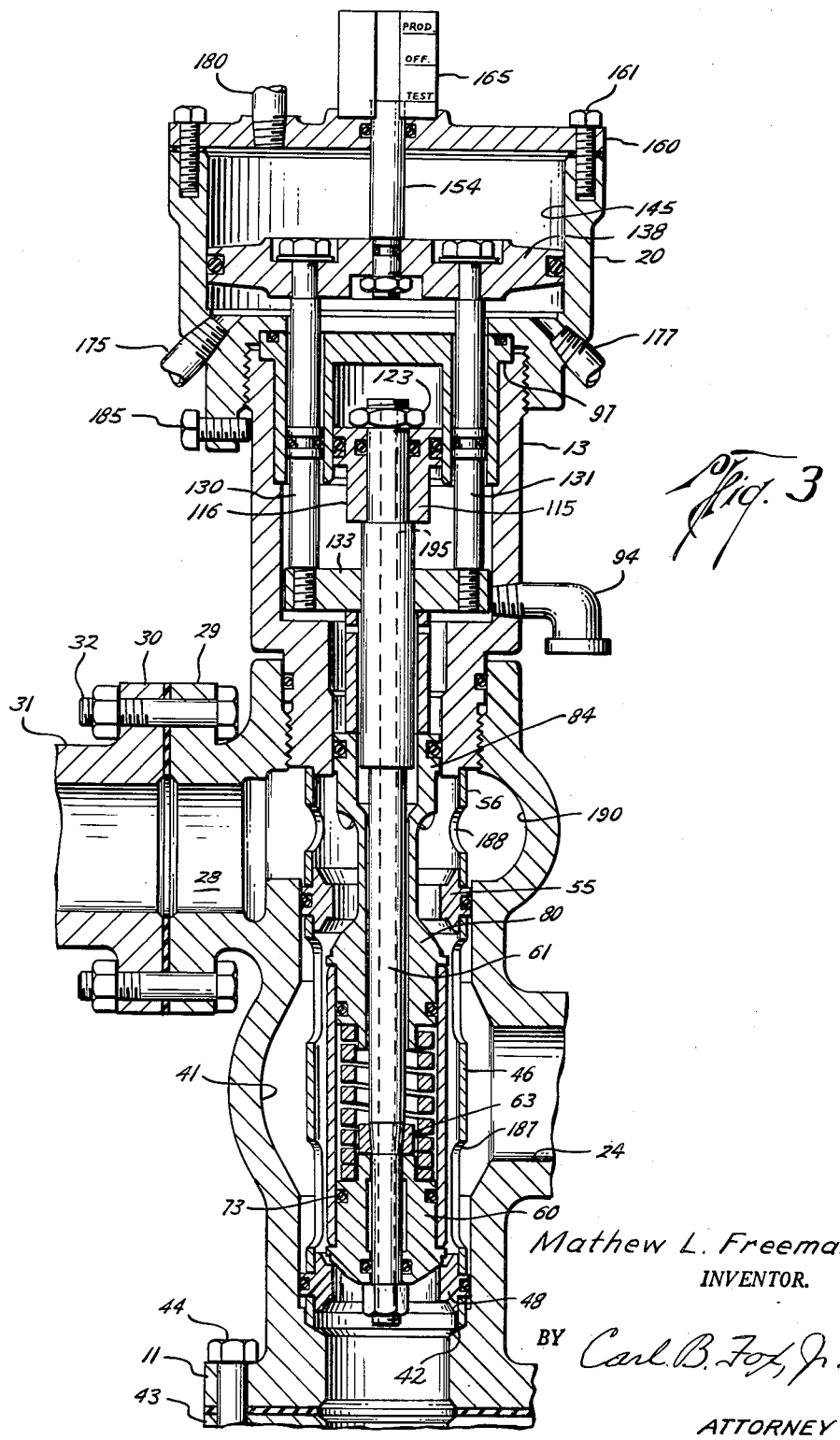
FIGURE 3 is a vertical section of the valve of FIGURE 1 in the condition wherein the main flow stream is "off" and the diverted flow stream is "on"

A flanged flow line 21, for bringing inlet flow to the three-way valve is connected at its flange 22 to flange 23 of lateral port 24 of body 10 by a plurality of the bolts 25. Port 24 is flared at 26 at its inner end. A second lateral port 28 (FIGURES 2, 3) is connected at flange 29 to flange 30 of a diverted flow line 31, or pipe, by a plurality of the bolts 32.

An axial cylindrical opening 40 of body 10 enlarges at its central part to form a chamber 41. At the lower end of opening 40 there is a conical reduction 42 below which opening 40 is connected at flange 11 to a main flow line having connection flange 43, a plurality of the bolts 44 connecting the flanges.

A perforate cylindrical sleeve 46 is disposed within opening 40 across chamber 41. A seat ring 48 surrounded by O-ring seal 49 disposed in a suitable groove therearound abuts the lower end of sleeve 46 and is supported upon a ring 50 seated upon conical surface 42. Seat ring 48 has outer upper and lower peripheral recesses to receive the sleeve 46 and ring 50 ends, respectively. Seat ring 48 has clean and sharp circular inner edge 51 to serve as a seat means, there being inner upper and lower recesses around the seat ring.

A second seat ring 55 rests on the upper end of sleeve 46, ring 55 being identical with ring 48. A perforate sleeve 56 rests on ring 55 in the outer upper peripheral recess thereof. The lower inner edge of ring 55 serves as a closure seat.

The valve means at lower seat ring 48 includes a plug 60, or valve, carried on the lower end of an elongate cylindrical shaft or stem 61. Shaft 61 has a conical reduction at 62. A ring boss 63 has an internal conical seat fitted to conical surface 62. An upstanding tubular extension 64 of plug 60 engages boss 63, and a nut 66 screwed onto a thread formation at the lower end of shaft 61 engages the lower end of the plug 60. The axial opening 67 of plug 60 closely fits the reduced lower part of the shaft at its ends but is enlarged at its central portion. An O-ring seal 68 in a suitable groove below the enlarged part of opening 67 forms a fluid-tight seal between the plug and shaft.

An outward flange 69 about plug 60 engages, in some positions, the lower end of a cylindrical tubular sleeve 72 the lower part of which is closely disposed about plug 60 above flange 69. An O-ring seal 73 disposed in a circular groove around the plug seals between sleeve 72 and the plug.

Below flange 69, plug 60 has a steeply conical downwardly converging seat surface 75 to sealingly engage inner edge 51 of seat ring 48, and therebelow, a less steeply conical downwardly converging surface 76, the plug terminating downwardly in a flat end to engage nut 66.

The valve means at upper seat ring 55 includes a plug mandrel 80 having a lower outward form like the outward form of plug 60, but inverted, this outward form including the extension 64a, O-ring seal 73a, flange 69a, seat 75a, and conical surface 76a, these parts corresponding to parts 64, 73, 69, 75, 76, respectively, of plug 60.

Mandrel 80, has, however, an axial opening 81 through which stem 61, above reduction 62, is freely slidably disposed. Above less steep conical surface 76a, mandrel 80 is tubular at 82, and flaringly enlarges at 83 to an integral cylindrical piston 84 having an O-ring seal 85 disposed in a groove encircling its upper end. Piston 84 is somewhat reduced in outer diameter at its part below the vicinity of seal 85.

A helical spring 86 is disposed under compression between plug 60 and plug mandrel 80, biasing them apart, each toward its seated position. The lower end of spring 86 surrounds extension 64 and engages against the upper end of plug 60, while the upper end of spring 86 surrounds extension 64a and engages against the lower end of mandrel 80. Spring sleeve 72 is slidingly sealed to plug 60 at O-ring seal 73 at its lower end, and is slidingly sealed to mandrel 80 at O-ring seal 73a at its upper end. Sleeve 72 is shorter in length than the distance between flanges 69, 69a when both valves are closed, and provides stop or limiting means for determining how far each valve may open when the other valve is closed, since each valve may move in the opening direction only to the position wherein the flange 69 or 69a thereof engages an end of sleeve 72, the opposite end of sleeve 72 being against the flange 69 or 69a of the opposite valve which is closed.

Operator or actuator body 13 has an O-ring seal 88 in a groove therearound above the threaded connection of its threads 16 into socket 12 of body 10. Thereabove, body 13 enlarges to be flush outwardly with body 10. Body 13 has a lower opening 90 of a cylindrical form and size to slidingly seal with piston 84. Thereabove, an opening 90 of larger size opens into a cylindrical chamber 92 of substantially larger diameter. A tapped vent port 93 has threadedly engaged therein an L 94 downturned to prevent entrance of falling materials. Chamber 92 enlarges at its upper part 96 which extends to the upper end of body 13, there being a circular recess 97 around its upper end.

Stem 61 has a diametrically enlarged portion 100 near its upper end, the lower end of stem portion 100 being axially slidably received within the enlarged upper end 101 of opening 81, there being conical transition surface 102 between portion 100 and the lower cylindrical part of opening 81. A cylindrical tubular sleeve 105 freely but closely surrounds stem portion 100 and rests at its lower end on the upper surface of mandrel 80. Sleeve 105 serves as a spacer, and has a plurality of perforations 106 therethrough near its upper end to permit venting therepast when both ends of sleeve 105 are engaged.

A chamber body 108 of generally cylindrical outward form is disposed with its upper circular outwardly projecting flange 109 seated in recess 97. Body 108 has downwardly opening piston chamber 110 of coaxial cylindrical form and a pair of oppositely disposed vertical cylindrical openings 113, 114 through its side wall. A piston 115, smaller at its lower portion 116 slidingly engages within chamber 110, and a seal therearound is provided at circular groove 118 wherein are disposed O-ring seal 119 and retainer ring 120 therebelow in the groove, the O-ring and retainer being loosely fitted vertically in the groove. Above enlarged portion 100, stem 61 is reduced at 121 to be received through an axial opening of piston 115, and the upper end of stem 61 is threaded to receive nut 123 to hold the piston in fixed position on the upper end of stem 61.

A pair of screws 130, 131 are each received through one of the openings 113, 114 of chamber body 108. Screws 130, 131 each have reduced threaded lower end 132 screwed into a suitable tapped opening of a circular disk-shaped plate 133. Plate 133 also has an axial opening slidably fitted about stem portion 100. Screws 130, 131 each have an axially short enlarged portion 134 having a circular groove therearound within which is disposed an O-ring seal 135, the enlargements 134 and the seals providing sliding and sealing disposition between screws 130, 131 and openings 113, 114. Screws 130, 131 are each reduced at their upper end to provide upwardly-facing shoulder 137 which engages the lower surface of operator piston 138 through openings of which the upper ends of the screws are received. Threads are provided at the upper ends of screws 130, 131, each to receive a nut 139 bearing against the bottom of one of the counterbores 140, 141 at the upper surface of piston 138, there being a steel washer 142 between each nut 139 and the bottom of its said counterbore.

Chamber body 20 has coaxial cylindrical chamber 145 therewithin through the bottom 146 of which there is a large opening 147, of sufficient diameter to freely receive both of the screws 130, 131. Piston 138 is slidingly and sealingly disposed in chamber 145, a seal therearound with the chamber wall being provided by O-ring seal 150 disposed in a suitable circular groove around the side of the piston. Piston 138 has axial opening 151 and lower counterbore 152 through which are disposed a stem 154 having a nut 155 screwed onto threads, at its lower end. An O-ring seal 156 disposed in a circular groove about stem 154 at opening 151 forms fluid-tight seal therebetween, and stem 154 enlarges above piston 138 to form a shoulder bearing downwardly against the upper surface of the piston.

A circular groove plate 160 is bolted, by a plurality of the screws 161 received through suitable bolt holes around the cover edge and screwed into suitable tapped openings about the upper end of body 20 around the upper end opening of chamber 145, to sealingly close chamber 145. Plate 160 has an axial opening through which stem 154 is received, a seal being provided at this point by an O-ring seal 163 disposed in a suitable circular groove around the axial opening. An upstanding ring 164 spacedly about the axial opening at the cover upper surface provides a curb within which the lower end of a steel indicator cylinder 165 is held. Cylinder 165 has axial cylindrical opening 166 to slidingly receive the upper part of stem 154, and a side slot 167 radially from its axis through which the upper end 168 may be observed. The indications "Prod." 170, "Off" 171, and "Test" 172 are marked on the outer curved surface of cylinder 165 adjacent slot 167 at vertical levels corresponding to the positions of stem end 168 when the apparatus is open to production, shut off, and open to test, respectively.

Pipe 175 screwed into angular tapped port 176 at an outer size enlargement of body 20 serves as means for introducing hydraulic fluid, gaseous or liquid, into chamber 145 beneath piston 138. Pipe 177 at the opposite side of body 120 is similarly screwed into angular tapped opening 178 providing means for exhausting the hydraulic fluid from the chamber. Pipes 175, 177, or conduits, are each provided with closure means (not shown) such as a valve or automatic valve for stopping flow therethrough. A pipe 180 screwed into a tapped opening 181 at a thickened part 182 on the upper surface of cover 160 provides inlet-outlet means for hydraulic fluids in chamber 145 above piston 138.

At the lower surface of body 20, depending below socket 18 thereof, there is a downwardly projecting web 184 having a tapped opening therethrough through which is screwed a screw 185 the inner end of which may be tightened against the side of body 13 to assure that a tight connection between bodies 13, 20 at threads 17 and socket 18 during operation may be maintained.

As has been mentioned, sleeves 46, 56 are each perforate, sleeve 46 having a plurality of the perforations 187 therethrough spaced over its area and sleeve 56 having a plurality of the perforations 188 therethrough spaced over its area. Perforations 187 are adjacent the enlargement represented by chamber 41 so that flow therethrough will be unrestricted, and perforations 188 are adjacent an enlargement 190 within body 10 adjacent outlet 28 so that flow therethrough will be unrestricted. As indicated, outlet 28 is offset upward vertically at its inner end by a transverse web 191 and a recess 192 thereabove, but the flow area therethrough is undiminished.

Stem 61 has an elongated opening 195 (shown by dashed lines in FIGURES 1 and 3), or bore, therethrough which vents pressure in pipe 43 to chamber 110 above piston 116 therein.

The interior of the assembly may be made available for access and removal by disconnecting the threaded unions between bodies 10, 13, 20, and without disturbing the connections of the three-way valve with pipes or conduits 21, 31, 43.

The valve, as heretofore mentioned, is a fully balanced valve, i.e. it is so constructed that the existence of differential pressure across the seal provided by either the plug 60 or plug mandrel 80, regardless of the direction in which said differential pressure acts, is either balanced equally or slightly overbalanced in such a manner that additional force acting to hold the plugs tightly against their respective seats is applied by the differential pressure, said force being of a magnitude directly proportioned to the amount of differential pressure. First considering lower plug 60, the upper area of piston 116 is equal to, or slightly greater, by the amount of 3 to 5 percent, than the area of plug 60 exposed to pressures in pipe 43 when plug 60 is seated at seat ring 48. The same pressure acts on the described piston area as acts on the described plug area. Therefore, if the areas are equal plug 60 is balanced and is not biased toward opening or toward closing by pressures within pipe 43. If the piston area is slightly greater than the plug area, plug 60 is subjected to an additional closing force by the existence of pressures in pipe 43.

Similarly, the upper plug mandrel 80 is balanced or slightly overbalanced to pressures in pipe 31, which act on areas in opposite directions, the areas being the area of the flared surface 83, on which pressures in pipe 31 act upwardly, and the area of the curved conical surface 76a which is exposed at seat ring 55 when closed, on which pressures in pipe 31 act downwardly. If the area enclosed by the outer periphery of seal 85 is equal to the exposed area of surface 76a, then plug mandrel 80 is balanced, and is not biased toward opening or toward closing by pressures within pipe 31. If, however, the described upper area is slightly greater than the described lower area, pressures in pipe 31 then act to provide an additional closing force on plug mandrel 80.

Both plug 60 and plug mandrel 80 are further balanced against the effect of pressure in chamber 41. On plug 60 the area within the seating edge of ring 48 is slightly greater than that within seal 73. Similarly, on plug mandrel 80 the area within the seating edge of ring 55 is slightly greater than that within seal 73a. The sealed chamber between the two plugs formed by sleeve 72 is not exposed to pressures from chamber 41, pipe 31 or pipe 42. It is, in fact, vented to the atmosphere around stem 61, through ports 106, and out connection 94. Pressure in chamber 41 therefore acts on the described differential area of each of the plugs to bias them toward closing. The closing force exerted on the plug thereby is directly proportional to the pressure in chamber 41.

It is therefore seen that pressures against the seals formed between plug 60 and ring 48 or plug mandrel 80 and ring 55, regardless of the direction in which applied, are independently offset so as to be balanced, or used to produce a tighter closure at the seal. It is pointed out that the amount of overbalance, created by a slightly increased offsetting area, is always a very small amount and used primarily to insure good contact between the seal plug and its seat. If the overbalance is very great, the force which holds a particular seal plug in its respective seat may be too great for the operator to overcome in opening the valve.

Normal flow through the valve enters through pipe 24 and exits through pipe 31 or pipe 43. In such cases the pressure upstream (chamber 41) is greater than the pressure downstream (pipe 31 or pipe 43) when the valve is closed to both outlets. In some applications, however, the pressure in either pipe 31 or pipe 43, or both, is greater than the pressure in chamber 41. The structure of this valve is so arranged that such "back pressures" do not act to unseat either valve.

Spring 86 is usually a strong spring, but does not have to be since outlet pressures are balanced as to each valve plug and do not act in any way to unseat the plugs. The purpose of spring 86 is to bias the plugs to closed positions when there is no pressure in chamber 41. Pressure in chamber 41 adds additional plug seating force in addition to that of the spring at the differential upper and lower plug areas, already described. Because of this, a pressure differential of over 5000 p.s.i.g. can exist across either plug and be effectively sealed thereby. Therefore, plug 60 forms a reliable and effective shut-off valve against pressures of higher magnitude than heretofore possible in unbalanced three-way valves previously known in the art. The same condition prevails at plug mandrel 80 as well.

The described upper pressure areas of plug 80 usually exceeds the described lower pressure area thereof, plug 80 being closed, by about five percent, and the described lower pressure area of plug 60 usually also exceeds the described upper pressure area thereof by about five percent.

Figure 4:
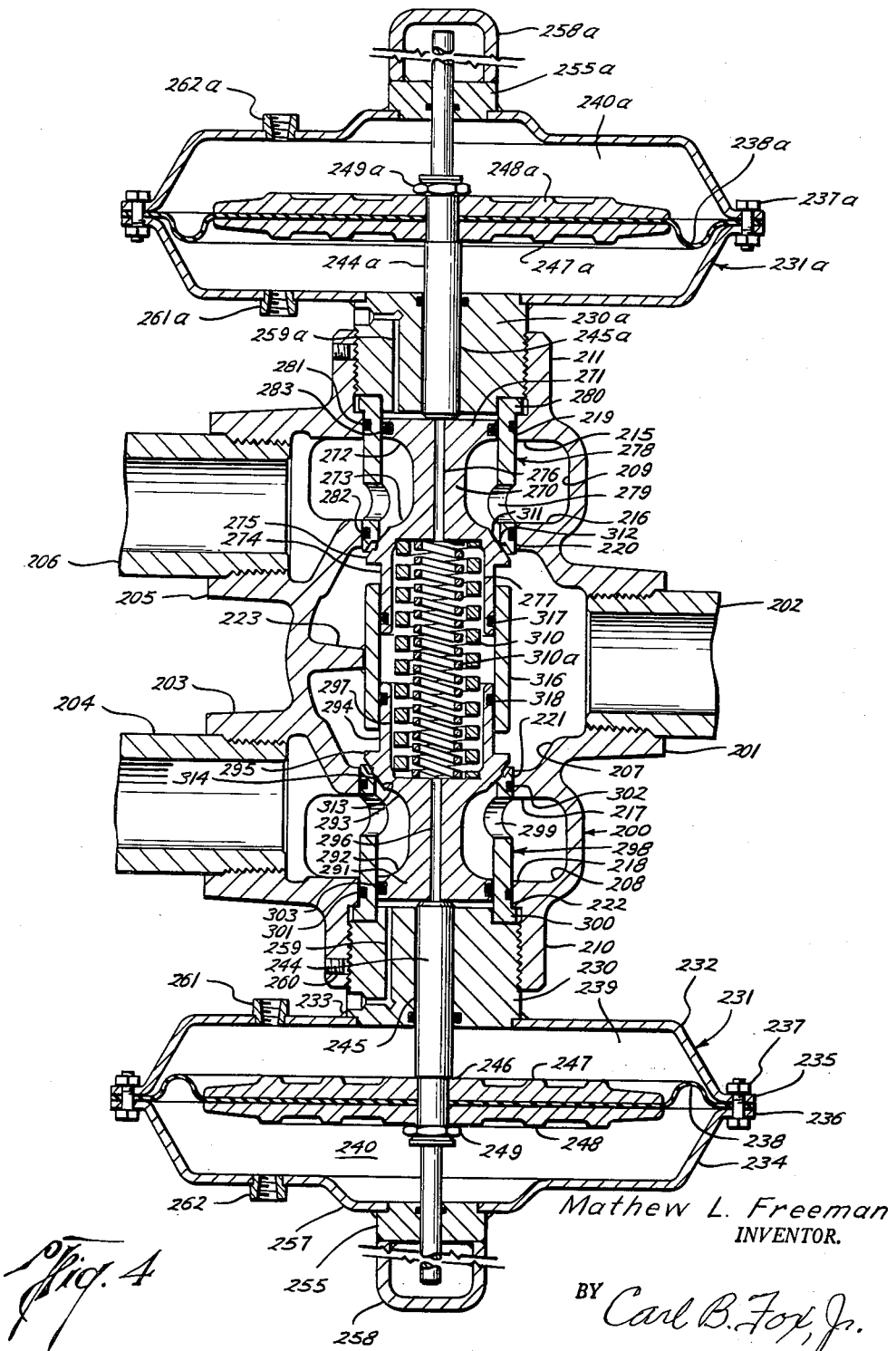
FIGURE 4 is a vertical axial cross-sectional view of a modified form of three-way valve according to the invention the valve being shown closed to both outlets; and, FIGURE 5 is a vertical axial cross-sectional view of still another modified form of three-way valve according to the invention, this valve also being shown closed to both outlets.

Referring now to the modified valve shown in FIGURE 4, valve body 200 has a threaded socket inlet 201 having pipe 202 screwed thereinto, a threaded socket outlet 203 for main flow having pipe 204 screwed thereinto, a second threaded socket outlet 205 for diverted stream flow having pipe 206 screwed thereinto, a central chamber formation 207 in fluid flow communication with inlet 201, a lower chamber formation 208 in fluid flow communication with outlet 203, an upper chamber formation 209 in fluid flow communication with outlet 205, a lower threaded socket bonnet opening 210 from the lower side of lower chamber 208, and an upper threaded socket opening 211 from the upper side of upper chamber 209, openings 210, 211 being in axial alignment, chambers 207, 208, 209 being of substantially circular horizontal cross-sectional forms and also coaxially aligned with openings 210, 211. Internally projecting horizontal flange formations 215, 216, 217, 218, respectively having aligned circular center openings 219, 220, 221, 222 of identical size, divide the open interior of body 200 into the zones of socket 211, chamber 209, chamber 207, chamber 208 and socket 210.

A horizontal inwardly projecting web 223 vertically centered of chamber 207 is a thrust member to be described later.

Opening 210 is closed by a screwed in bonnet 230 carrying a welded-on diaphragm actuator or motor 231 including upper circular dished element 232 having a center opening welded about bonnet 230 and 233 and a lower circular dished element 234. Elements 232, 234 have surrounding edge flanges 235, 236 held together by a plurality of bolts 237 therethrough, and flexible diaphragm element 238 is sandwiched between the flanges to separate sealingly zones 239, 240 above and below the diaphragm, and to form a gasket between the flanges to form a fluid-tight seal therebetween.

Plunger stem 244 slidably received through an axial bonnet opening 245 has shoulder 246 against which is disposed pressure plate 247 bonded onto the upper side of diaphragm 238. Stem 244 extends sealingly through the diaphragm and a second pressure plate 248 bonded to the lower side of the diaphragm is held thereon by nut 249 screwed onto the stem. Therebelow stem 244 is of reduced diameter and extends downwardly slidably through an opening of flat cylindrical cap 255 which is welded on at 256 around a central opening of element 234 in the future dished portion 257 thereof. Stem 244 extends below cap 255 within a U-frame 258 welded onto the cap to form a cage around the stem end. The vertical position to which the stem end is moved indicates the position of the diaphragm and the position of the opposite, or upper, stem end with relation to the bonnet.

Bonnet 230 has L-port 259 therethrough for venting the space above bonnet 230 to atmosphere. Threaded-in set-screw 260 holds the threaded bonnet connection against relative movement.

Threaded sockets 261, 262 leading into diaphragm zones 239, 240 permit connection of fluid lines (not shown) for introduction and withdrawal of fluids to above and below the diaphragm, which is moved correspondingly by a relatively higher pressure above or below the diaphragm.

It will be noted that upper bonnet 230a and upper diaphragm actuator or motor 231a are identical with lower bonnet 230 and lower diaphragm actuator or motor 231. The descriptions thereof will, therefore, not be repeated, and corresponding elements of the upper bonnet and actuator may hereinafter be referred to by the same reference numerals designating corresponding parts of the lower bonnet and actuator, with the addition of the suffix "a." It must be recognized, of course, that the upper members are in inverted positions.

An upper plug mandrel 270 has an integral upper circular flange piston 271 below which is conically flared connective surface 272. Therebelow, an oppositely conically flared connective surface 273 enlarges downwardly to integral cylindrical plug formation 274 having surrounding circular flange 275 at its upper part. Plug mandrel 270 has axial cylindrical opening 276 therethrough which opens into inverted cylindrical cup-shape recess 277 in the bottom end of the plug.

Plug mandrel 270 is disposed within a cylindrical tubular sleeve 278 having a plurality of perforations 279 therethrough. Sleeve 278 has upper outward flange 280 extending over flange 215, sleeve 278 fitting opening 219 closely and being sealed thereto by O-ring 281 in a groove around the sleeve. Sleeve 278 is similarly sealed around by O-ring 282 at opening 220 of flange 216. Plug 270 is sealed around by O-ring 283 in a groove around flange 271 thereof. Sleve 278 has a shaped lower end corresponding to the shape of flange 275. Bonnet 230a has a lower edge recess fitted over flange 280, and the bonnet is screwed down against the sleeve to hold the sleeve in place.

The lower end of stem 244a is disposed to move down against plug 270 to move the plug downwardly.

A lower plug mandrel 290, identical with plug mandrel 270, is disposed inverted with respect to plug mandrel 270, and spaced therebelow. Plug mandrel 290 has flange piston 291, flared surface 292, flared surface 293, cylindrical plug formation 294, surrounding flange 295, axial opening 296, and recess 297, all of which are as described for the corresponding parts of plug mandrel 270.

A sleeve 298, identical with sleeve 278 but disposed invertedly and therebelow, has openings 299 therethrough, flange 300 underlying flange 218 against which bonnet 230 is screwed to hold sleeve 298 in place, O-ring seal 301 in a groove around the sleeve to seal around the sleeve in opening 222, O-ring seal 302 in a groove around the sleeve at flange 217, O-ring seal 303 in a groove around flange 291 to seal between the plug and sleeve, all of which correspond to identical elements of plug 270 and sleeve 278 thereabove.

A helical compression spring 310 is disposed under vertical compression with each end in one of the facing cup recesses 277, 297 to bias the plug mandrels apart and toward their closed positions. A second spring 310a, of smaller size and of opposite helical taper, is disposed coaxially within spring 310 for the same purpose to supplement spring 310. Only one such spring, or equivalent other biasing means may be used as desired. Plug 274 seats at a conically tapered lower portion 311 of surface 273 against rectangular edge 312 of the formed lower end of sleeve 278. Plug 294 seats at a conically tapered upper portion 313 of surface 293 against rectangular edge 314 of the formed upper end of sleeve 298. Both seatings form fluid tight closures by the plugs at the sleeve ends, thereby shutting off fluid flow between chamber 207 and chamber 209, and between chamber 207 and chamber 208, when the plugs are seated.

An imperforate cylindrical tubular spring sleeve 316 sealingly and slidingly surrounds portion of plugs 274, 294, plug 274 having O-ring seal 317 in a groove therearound and plug 294 having O-ring seal 318 in a groove therearound, each providing a fluid-tight seal between the plug and the interior of spring sleeve 316.

Should the possibility of leakage at seal 317 or seal 318 be of concern, the vent passages 276 and 296 leading to vent outlets 259a and 259 respectively, could be restricted in some manner, such as by orifice, porous metal plug, relief valve, etc. With the passages thus restricted leakage past seals 317 and 318 would create an increase in pressure within the space between plugs 274 and 294. This in turn would increase the force acting to hold the two plugs in their seats and, at the same time, allow a controlled rate of leakage to occur through the vent openings to signal the presence of a faulty seal.

Actuator 231a, when diaphragm 238a thereof is moved downwardly by pressured fluid introduced into zone 240a through inlet 262a, causes downward axial movement of plunger stem 244a against plug mandrel 270 to move plug 274 off of its seat to open position. Actuator 231, when diaphragm 238 thereof is moved upwardly by pressured fluid introduced into zone 240 through inlet 262, causes upward axial movement of plunger stem 244 against plug mandrel 290 to move plug 294 off of its seat to open position. However, when plug 274 is open, plug 294 cannot ordinarily be opened (zone 240 not being under pressure) because the length of sleeve 316 is such that flange 275 will abut its upper end to slidingly move sleeve 316 down against flange 295 and hold plug 294 closed against its seat. And vice versa, when plug 294 is open, plug 274 cannot ordinarily be opened (zone 240a not being under pressure) because sleeve 316 will be moved upwardly against flange 275 to hold plug 274 closed by abutment of flange 295.

The above type of operation is realized by pressuring of one zone 240, 240a in sufficient excess over the other zone. But by balancing of pressures in zones 240, 240a, a distinct type of operation wherein plug 274 or 294 is opened partway simultaneous with partial opening of plug 294 or 274 may be achieved. Overbalancing of either zone will then cause corresponding motion of both plugs.

Thus it is seen that the valve of FIGURE 4 may be operated so that there is a shut-off of one valve before the other valve is opened, or, on the other hand, the valve of FIGURE 4 may be operated so that one valve is opened or closed simultaneously with the closing or opening of the other valve.

Web 223, previously mentioned, in opposite inlet pipe 202 and socket 201, and spring sleeve 316 is slidingly engaged against its inner edge. Thus, the force of the inlet flow stream against sleeve 316 is prevented by web 223 from moving sleeve 316 out of alignment between the plug mandrels, which might cock the sleeve on the plugs and prevent relative axial motion therebetween.

Figure 5:
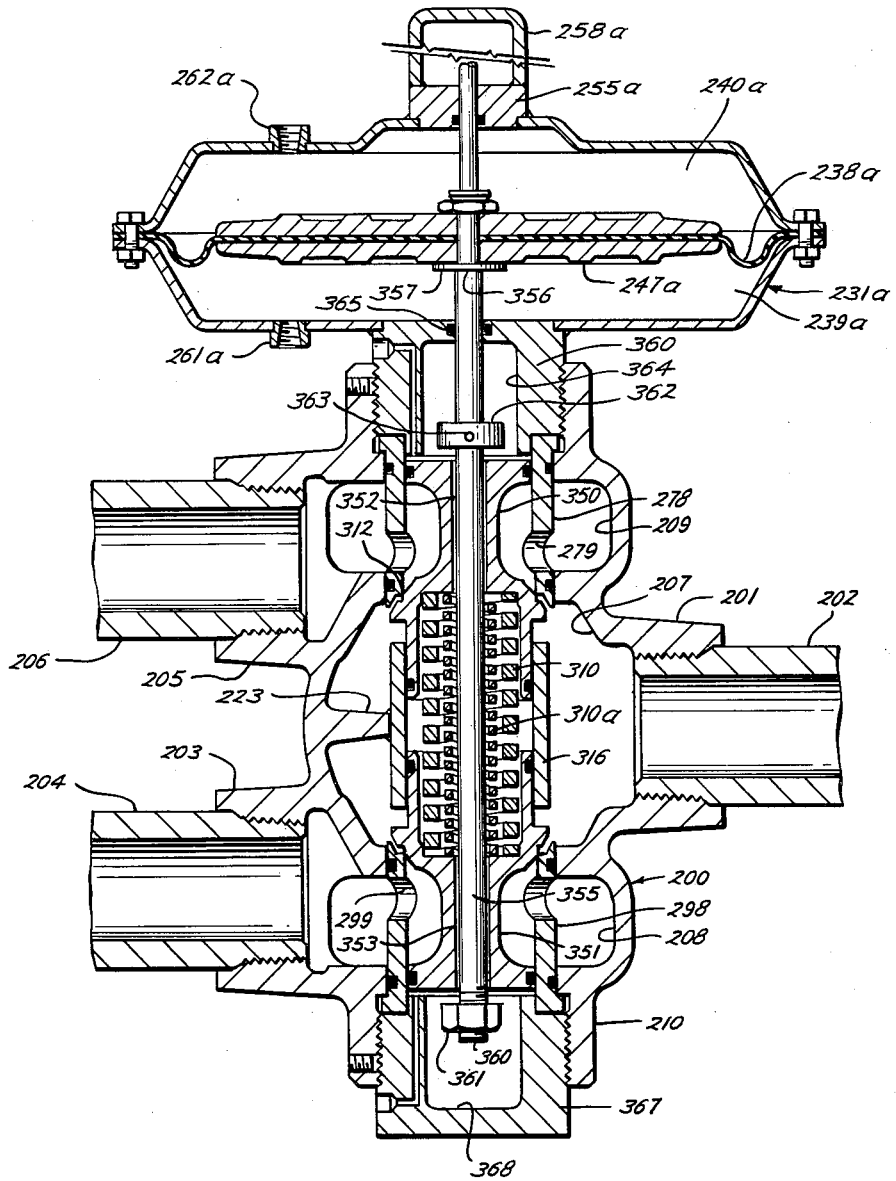

Referring now to FIGURE 5, there is shown another form of three-way valve according to the invention. The valve of FIGURE 5 resembles the valves of FIGURES 1-3 and 4, being closest in structure to the valve of FIG- URE 4. Valve elements in FIGURE 5 which are identical with valve elements of FIGURE 4 are designated by the same reference numerals.

In the FIGURE 5 embodiment, plug mandrels 350, 351 are identical with plug mandrels 270, 290 of the FIGURE 4 embodiment, except that they each include a shaft-receiving axial opening or bore 352, 353, respectively, through which a shaft or stem 355 is slidingly received. Stem 355 has annular shoulder 356 on which perforate washer 357 is disposed, the washer engaging the lower side of pressure plate 247a of diaphragm actuator or motor 231a, and nut 249a holding the diaphragm assembly in place on the stem. Stem 355, below the diaphragm, continues through bonnet 360, opening 352 of plug mandrel 350, springs 310, 310a, opening 353 of plug mandrel 351, and terminates downwardly at lower threaded end 360 onto which is screwed a nut 361. A steel collar 362 is held around stem 355 above plug mandrel 350 and is held in place by a pin 363 inserted through suitable perforations of the stem and collar.

Bonnet 360 is identical with bonnets 230, 230a of the FIGURE 4 embodiment except that instead of having a plunger stem opening 245 or 245a therethrough, there is a cup-shaped interior recess 364 opening from the end of the bonnet toward plug mandrel 350. There is a shaft opening through the closed bottom of the recess having an O-ring seal 365 disposed in a groove about the shaft opening, stem 355 being sealingly and slidingly disposed therethrough. An L-port 259a is provided through the bonnet.

A bonnet 367 is screwed into socket 210 at the lower end of body 200 to close the socket opening. Bonnet 367 has interior upwardly opening cup-shaped recess 368, and an L-port 259 is provided. No shaft opening corresponding to that of bonnet 360 is provided.

Actuator 231, when pressured fluid is introduced through inlet 262a to pressure zone 240a to a pressure higher than exists in zone 239a below the diaphragm 238a so that diaphragm 238a is moved downwardly, moves stem 355 axially downwardly until collar 362 engages the upper side of plug mandrel 350, whereupon plug mandrel 350 is moved downwardly, by further downward stem motion, and off of its seat 312 to open fluid flow communication between chambers 207, 209. Opposite stem motion, that is, pressuring zone 239a through inlet 261a to a pressure higher than exists in zone 240a so that stem 355 moves axially upwardly, moves nut 361 at the lower end of the stem upwardly to lift plug mandrel 351 off of its seat and establish flow communication between chambers 207, 208 for fluid flow between inlet pipe 202 and main flow outlet pipe 204. Springs 310, 310a bias plug mandrels 350, 351 apart, both toward closing, as in the other embodiments.

When diaphragm 238a is in its neutral position halfway between the upper side of zone 240a and the lower side of zone 239a, collar 362 is spaced somewhat above plug mandrel 350 and nut 361 is spaced somewhat below plug mandrel 351, so that stem 355 has some "idling" motion in either direction before one of the plug mandrels is engaged by the collar or nut. Thus, on upward motion of stem 355 from a downward position wherein plug mandrel 350 is open, plug mandrel 350 will seat and close before opening of plug mandrel 351 commences. The collar and nut may be flush against the mandrels if desired, eliminating the "idling" stem motion. Recesses 364, 368 of the bonnets provide space for movement of the collar or nut with the stem when the opposite end plug mandrel is opened.

Referring now to both FIGURES 4 and 5, the mandrels 270, 290 and 350, 351 are of an offset design, similar to plug mandrel 80 shown in FIGURE 1 and previously described. Fluid pressures in outlets 204, 206 and in chambers 208, 209 act on the offsetting areas created by the seals 283 and 303 of mandrels 270 and 290 respectively as well as the seal areas of the two plugs. Depending on whether the offsetting areas are equal to or slightly greater than the seal areas of the plugs the force of pressure against these seal areas is either balanced or slightly overbalanced. If areas are equal and pressures therefore balanced the plug mandrels are not biased in either direction when they are in closed position. If the offsetting area is slightly larger than the seal area the pressure is slightly overbalanced and the plug mandrels 270, 290 are therefore further biased toward closing. These outlet pressure balanced closure elements are unique, and are not provided in any three-way valves of conventional design. In view of the provision of these closure elements, the three-way valves of FIGURES 4 and 5 can close off the outlet pipes 204, 206 regardless of the magnitude of pressure of the fluid which they contain. Therefore, there is no limitation as to the magnitude of back pressure in the outlets from the valve that restricts the application of the valves.

Similarly, the closure elements being seated by the inlet fluid pressure in pipe 202, because of the previously described areas of the closure elements independently acted on by pressures in chamber 207 to close the valves, there is likewise no inherent pressure limitation on the pressure in inlet pipe 202, so that the valve will function satisfactorily under any inlet fluid pressure conditions as well as under any outlet fluid pressure conditions, and the valve is susceptible to universal application and use.

The only limitation as to use of the valve are the internal pressure capacities of body 200 and connected fittings, which can be made as great as desired, and the capacity of the operators to open the valves against pressure, which also can be made as great as desired. For very high pressure service, the actuators may be replaced by other actuators of greater capacity, there being a variety of these known in the art which may be suitably used.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. A balanced three way valve, comprising a hollow body having an inlet and two outlets, each said outlet being free of any flow restriction therein whatsoever, two closure means disposed within said body each for closing one of said outlets and each movable to positions wherein the outlet is open, said closure means being aligned each for movement aligned on opening and closing with the other said closure means, each said closure means including opposing surfaces openly exposed to pressures in the outlet closable thereby at all times regardless of whether said outlet is at any given time closed by said closure means or open and substantially pressure-balanced to fluid pressures in said outlet which it is disposed to close by said outlet fluid pressures acting on said opposing surfaces of the closure means, each said closure means including surface means on which pressures in said inlet act to close the closure means independently of pressures in either of said outlets, biasing apart means for said closure means urging each said closure means toward closing while moving only one said closure means toward closing, and including chambers means sealingly enclosing said biasing apart means under atmospheric pressure whereby said biasing apart means is not exposed to fluids flowing through the valve between said inlet and one or both of said outlets.

2. The combination of claim 1, said outlets being parallelly disposed one to the other.

3. The combination of claim 1, said outlets being perpendicularly disposed one to the other.

4. The combination of claim 1, including means for moving each said closure means between open and closed positions and for closing each closure means before the other closure means is opened.

5. The combination of claim 1, including means for moving each said closure means between open and closed positions and for closing each said closure means after the other closure means is opened.

6. The combination of claim 1, including actuating means for separately moving each said closure means between open and closed positions, and including means for limiting motion of the closure means which said actuating means is not then moving.

7. The combination of claim 1, including first elongate shaft means having one of said closure means affixed therearound and slidingly disposed through the other of said closure means, actuator means for moving said first shaft means longitudinally to open said one closure means, second shaft means also operated by said actuator and disposed to open said other closure means.

8. The combination of claim 1, including elongate shaft means slidably disposed through each said closure means, actuator means for moving said shaft means reciprocably longitudinally, means carried on said shaft means for moving one of said closure means when said shaft means is moved in one longitudinal direction, and means carried on said shaft means for moving the other of said closure means when said shaft means is moved in the other longitudinal direction.

9. The combination of claim 8, said shaft and means moving neither said closure means over a portion of said reciprocable longitudinal movement thereof.

10. The combination of claim 1, including axially aligned elongate shafts each disposed for movement of one of said closure means upon movement thereof in one longitudinal direction, and means for moving each of said shafts in both longitudinal directions.

11. Balanced three-way valve, comprising a hollow body having an inlet and two outlets, ring shaped seat means adjacent each outlet within said body, perforate lining means within said body defining zones therewithin adjacent said inlet and each said outlet and for holding each said seat means stationarily in position, means for sealing around each said seat means within said body, reciprocable plug means adjacent each said seat means and each having a reduced portion extending through said seat means and each movable to one said seat means to close one said outlet and each movable away from one said seat means to open one said outlet, means for biasing said plug means apart each toward said outlet-closing position thereof, means for partitioning said biasing means from said body hollow and said zones vented to the exterior of said body, said plug means each including first surface areas on which unrestricted fluid pressures in the outlet which said plug means closes act in a valve-opening direction and second surface areas at least substantially equal to said first surface areas on which full outlet fluid pressures in the outlet which said plug means closes act in a valve-closing direction, said plug means each having a surface within said body hollow on which fluid pressures within said body hollow act independently of fluid pressures in either of said outlets to bias said plug means toward closed position at said seat means.

12. The combination of claim 11, said plug means each being slightly overbalanced toward closing by said outlet fluid pressures acting on said first and second surface areas.

13. The combination of claim 11, including elongate first shaft means disposed slidingly through one said plug means and affixed to the other said plug means, means for reciprocatingly moving said first shaft means longitudinally to move said other plug means away from its seat means, second shaft means engageable with said one plug means, means for reciprocably moving said second shaft means longitudinally to move said one plug means away from its seat means.

14. The combination of claim 11, including separate shaft means for moving each said plug means away from its said seat means, and separate actuator means each coupled with one said shaft means for moving the shaft means reciprocatingly longitudinally.

15. The combination of claim 11, including shaft means disposed slidingly through both of said plug means, actuator means for moving said shaft means reciprocatingly longitudinally, means carried on said shaft means each for moving one of said plug means when said shaft means is moved reciprocatingly longitudinally.

16. The combination of claim 11, each said plug means including opposed surfaces of equal area exposed to fluid pressures in one said outlet when closed against its said seat.

References Cited in the file of this patent

UNITED STATES PATENTS

| | | |
|---|---|---|
| 849,532 | Coutant | Apr. 9, 1907 |
| 1,036,451 | Casper | Aug. 20, 1912 |
| 2,602,631 | Eickmeyer | July 8, 1952 |
| 2,897,836 | Peters | Aug. 4, 1959 |

FOREIGN PATENTS

| | | |
|---|---|---|
| 17,049 | Great Britain | of 1892 |